(12) United States Patent
Hua

(10) Patent No.: US 9,906,262 B2
(45) Date of Patent: Feb. 27, 2018

(54) ALL-ANALOG AND HYBRID RADIO INTERFERENCE CANCELLATION USING CABLES, ATTENUATORS AND POWER SPLITTERS

(71) Applicant: The Regents of the University of California, Oakland, CA (US)

(72) Inventor: Yingbo Hua, Riverside, CA (US)

(*) Notice: Subject to any disclaimer, the term of this patent is extended or adjusted under 35 U.S.C. 154(b) by 0 days.

(21) Appl. No.: 14/998,177

(22) PCT Filed: Jun. 27, 2014

(86) PCT No.: PCT/US2014/044680
§ 371 (c)(1),
(2) Date: Dec. 23, 2015

(87) PCT Pub. No.: WO2014/210518
PCT Pub. Date: Dec. 31, 2014

(65) Prior Publication Data
US 2016/0285504 A1 Sep. 29, 2016

Related U.S. Application Data

(60) Provisional application No. 61/840,640, filed on Jun. 28, 2013.

(51) Int. Cl.
*H04B 1/52* (2015.01)
*H04B 1/12* (2006.01)
(Continued)

(52) U.S. Cl.
CPC ............ *H04B 1/52* (2013.01); *H04B 1/1018* (2013.01); *H04B 1/123* (2013.01); *H04B 1/525* (2013.01)

(58) Field of Classification Search
CPC ...... H04B 1/525; H04B 1/38; H04B 7/15564; H04B 1/44; H04B 7/15585;
(Continued)

(56) References Cited

U.S. PATENT DOCUMENTS 4,952,193 A     8/1990   Talwar
5,561,395 A * 10/1996   Melton ............... H03G 3/3042
                                                                                                                                                                                                330/124 R
(Continued)

OTHER PUBLICATIONS

United States Patent and Trademark Office, International Search Report issued in PCT/US2014/044680, dated Nov. 3, 2014, 2 pages.
(Continued)

*Primary Examiner* — Emmanuel Bayard
(74) *Attorney, Agent, or Firm* — Cislo & Thomas, LLP

(57) ABSTRACT

A radio interference cancellation device that cancels self-interference from a transmitter to a receiver that includes a 2N-way RF power splitter having an input and 2N outputs, a power combiner having 2N+1 inputs and an output, and 2N adaptively controllable attenuators. Each adaptively controllable attenuator is coupled by cables between a different output of the 2N-way RF power splitter and a different input of the power combiner, each cable having a total length selected to provide a delay equal to a different one of $mT(m=1,N)$ and $mT+\delta(m=1,N)$, where T is a delay smaller than the inverse of a bandwidth of the transmitter and receiver, and $\delta$ is $\frac{1}{4}f_c$, where $f_c$ is the carrier frequency of an RF signal transmitted by the transmitter.

20 Claims, 8 Drawing Sheets

(51) Int. Cl.
  *H04B 1/525* (2015.01)
  *H04B 1/10* (2006.01)
(58) Field of Classification Search
  CPC ...... H04B 1/71072; H04B 1/52; H04B 1/123;
         H04B 1/126; H04L 5/14; H04L 5/1461;
         H04L 27/2614; H04L 5/1423
  USPC .............. 375/254, 346, 284–285, 296, 348
  See application file for complete search history.

(56) References Cited

U.S. PATENT DOCUMENTS

| | | | | |
|---|---|---|---|---|
| 5,642,155 | A * | 6/1997 | Cheng | H04N 7/17309 348/E7.07 |
| 5,691,978 | A | 11/1997 | Kenworthy | |
| 6,665,349 | B1 * | 12/2003 | Cherubini | H04L 5/143 375/219 |
| 6,941,576 | B2 * | 9/2005 | Amit | H04L 12/2801 348/E7.05 |
| 7,916,672 | B2 * | 3/2011 | Elahi | H04B 17/21 370/310 |
| 8,498,322 | B2 * | 7/2013 | Smiley | H03F 1/3235 330/149 |
| 8,942,658 | B2 * | 1/2015 | Banwell | H04B 1/58 343/852 |
| 9,019,849 | B2 * | 4/2015 | Hui | H01Q 3/2611 370/252 |
| 9,203,455 | B2 * | 12/2015 | Yang | H04B 1/10 |
| 9,210,535 | B2 * | 12/2015 | Kheirkhahi | H04B 1/525 |
| 9,331,737 | B2 * | 5/2016 | Hong | H04B 1/56 |
| 9,415,234 | B2 * | 8/2016 | Turner | A61N 2/02 |
| 9,450,785 | B2 * | 9/2016 | Aggarwal | H04L 25/03 |
| 9,490,918 | B2 * | 11/2016 | Negus | H04B 15/00 |
| 9,490,963 | B2 * | 11/2016 | Choi | H04L 5/1461 |
| 2003/0031279 | A1 | 2/2003 | Blount et al. | |
| 2004/0142700 | A1 * | 7/2004 | Marinier | H01Q 3/2611 455/454 |
| 2006/0052065 | A1 * | 3/2006 | Argaman | H04B 7/0667 455/101 |
| 2007/0133425 | A1 * | 6/2007 | Chappell | H04L 43/00 370/250 |
| 2007/0275664 | A1 * | 11/2007 | Uhl | H04B 7/0602 455/67.11 |
| 2009/0238103 | A1 * | 9/2009 | Yamazaki | H04B 1/38 370/310 |
| 2010/0159837 | A1 * | 6/2010 | Dent | H04B 1/525 455/63.1 |
| 2012/0041745 | A1 * | 2/2012 | Spilman | G06F 11/261 703/13 |
| 2012/0140685 | A1 * | 6/2012 | Lederer | H04L 27/3854 370/286 |
| 2012/0147790 | A1 * | 6/2012 | Khojastepour | H01Q 3/2605 370/277 |
| 2012/0154249 | A1 * | 6/2012 | Khojastepour | H01Q 3/2605 343/893 |
| 2012/0201153 | A1 * | 8/2012 | Bharadia | H04B 1/525 370/252 |
| 2012/0201173 | A1 | 8/2012 | Jain et al. | |
| 2012/0263078 | A1 * | 10/2012 | Tung | H04B 7/15564 370/277 |
| 2012/0329523 | A1 * | 12/2012 | Stewart | H03F 1/3247 455/562.1 |
| 2013/0089009 | A1 | 4/2013 | Li et al. | |
| 2013/0169466 | A1 * | 7/2013 | Frederick | G08B 13/248 342/22 |
| 2013/0215805 | A1 * | 8/2013 | Hong | H04B 15/00 370/281 |
| 2014/0169236 | A1 * | 6/2014 | Choi | H04L 5/1461 370/278 |
| 2014/0204808 | A1 * | 7/2014 | Choi | H04L 5/1461 370/278 |
| 2014/0348018 | A1 * | 11/2014 | Bharadia | H04L 5/1461 370/252 |
| 2015/0222358 | A1 * | 8/2015 | Totten | H04L 12/2885 398/99 |
| 2016/0094332 | A1 * | 3/2016 | Griffiths | H04B 1/109 370/278 |
| 2016/0105213 | A1 * | 4/2016 | Hua | H04B 1/525 370/278 |
| 2016/0233918 | A1 * | 8/2016 | Kennard | H04L 27/2626 |
| 2016/0234005 | A1 * | 8/2016 | Hong | H04B 15/00 |

OTHER PUBLICATIONS

United States Patent and Trademark Office, Written Opinion issued in PCT/US2014/044680, dated Nov. 3, 2014, 7 pages.

* cited by examiner

ALL-ANALOG AND HYBRID RADIO INTERFERENCE CANCELLATION USING CABLES, ATTENUATORS AND POWER SPLITTERS

CROSS-REFERENCE TO RELATED APPLICATIONS

The present patent application is a national phase application of International Application No. PCT/US2014/044680, which claims the benefit of U.S. provisional patent application 61/840,640, filed Jun. 28, 2013, the contents of which are hereby incorporated by reference in their entirety for all purposes.

FIELD OF THE INVENTION

The present invention relates to radio interference cancellation, more specifically to an all-analog radio interference cancellation using cables, attenuators and power splitters.

BACKGROUND

As the radio spectrum becomes more crowded, the need for spectrally efficient radio technologies increases. One such technology is known as full-duplex radio that can transmit and receive at the same time and same frequency. Advantageously, full-duplex radio technology appears on the verge to be proven feasible for many commercial and military applications, a key technical challenge still remains that is termed self-interference cancellation (SIC). A full-duplex radio must have at least one radio transmit chain and one radio receive chain. The signal emitted out of the transmit chain is also picked up by the receive chain, creating self-interference.

The self-interference can be reduced by first increasing the attenuation between the transmit chain and the receive chain. This attenuation can be achieved by using various antenna technologies and even possibly using some radio blocker/absorber in between the transmit and receive antennas in some situations. This approach is also called passive cancellation in the literature.

The remaining self-interference has to be actively canceled by one or more SIC methods. For any SIC method, a cancellation waveform must be first generated based on a source signal from the transmit chain and then used for cancellation somewhere in the receive chain.

For radio interference cancellation, there are four stages which can be used in sequence for maximal benefit: passive interference suppression, all-analog interference cancellation, hybrid interference cancellation, and all-digital interference cancellation. Among the four stages, all-analog interference cancellation is the least mature.

Given the radio frequency (RF) nature of the interference, it is natural to think of an analog cancellation path between the transmitter and the receiver at the RF frontend. This is exactly what was proposed by M. Jain, J. I. Choi, T. M. Kim, D. Bharadia, S. Seth, K. Srinivasan, P. Levis, S. Katti, and P. Sinha, in their paper titled "Practical, real-time, full duplex wireless", In Proc. Mobicom 2011; and J. G. McMichael and K. E. Kolodziej, in their paper titled "Optimal tuning of analog self-interference cancelers for full-duplex wireless communication", 5th Annual Allerton Conference, October 2012, where a tunable analog circuit is used for interference cancellation. These analog methods will be referred to in this disclosure as all-analog where the cancellation path has analog input interface, analog filter and analog output interface as shown in FIG. 1. An advantage of all-analog passive circuits is that virtually no noise is introduced and the remaining interference can be further canceled at a later stage.

The Stanford method, as disclosed in S. Hong, J. Mehiman, and S. KattiPicasso's paper "Picasso: Flexible RF and Spectrum Slicing", SIGCOMM'12, Helsinki, Finland, Aug. 13-17, 2012, can only handle all-pass interference channel. This all-pass condition fails completely if passive interference suppression has been applied (or if the transmit antenna and the receive antenna are far apart from each other). The passive interference suppression typically blocks the line-of-sight propagation between the antennas, which makes the interference channel highly frequency-selective. For intra-base station interference cancellation, passive interference suppression (via antenna nulling and other means) is desirable before any active interference cancellation method is used.

The MIT method, as disclosed in J. G. McMichael and K. E. Kolodziej' paper "Optimal tuning of analog self-interference, cancelers for full-duplex wireless communication," 5th Annual Allerton Conference, October 2012, requires a joint tuning of one set of attenuators as well as another set of phase shifters. Even if the desired (complex) value of the attenuation of an attenuator and the phase of a phase-shifter is available, it is very difficult (if not impossible) to implement it accurately with the current analog technology. This is because the phase of a phase shifter is hard to control digitally and furthermore the phase of a phase shifter is highly coupled with its insertion loss (and hence highly coupled with the overall attenuation of a path comprising of the attenuator and the phase shifter). And furthermore, the residual interference from the MIT cancellation circuit is a highly nonlinear function of the joint set of the highly coupled tuning parameters phases and attenuations. It is extremely hard to find the optimal tuning even if the residual interference was not distorted by any unknown transfer functions (such as $H\_1(f)$ and $H\_2(f)$). The cancellation results are all based on computer simulation assuming zero coupling between attenuations and phases. No hardware-based cancellation result was shown.

An alternative to all-analog is all-digital. There are well established theories for adaptive filters in the prior art that can be readily implemented in baseband digital signal processing (DSP) circuits. An all-digital cancellation path has digital input interface, digital filter and digital output interface. But this method works only if the interference, or residue interference after an initial cancellation, is not much stronger than the desired signal from a remote radio or otherwise the desired signal suffers from a large quantization noise. Furthermore, this method also suffers from the transmission noise. The interference caused by the noise originated from the transmit chain cannot be regenerated in the baseband for cancellation.

The alternative to all-analog and all-digital is hybrid. In order to preserve the desired (weak) signal in the receive chain, the strong interference should be canceled at the RF frontend of the receiver. For this purpose, several authors have proposed various forms of transmit beamforming based methods (see for example A. Sahai, G. Patel, and A. Sabharwal, "Pushing the limits of full-duplex: Design and real-time implementation", Online at arXiv, 2011; T. Riihonen, S. Werner, and R. Wichman, "Mitigation of loopback self-interference in full-duplex MIMO relays," IEEE Trans Signal Proc., Vol. 59, No. 12, December 2011; Y. Hua, "An overview of beamforming and power allocation for MIMO relays," Proc of MILCOM 2010, pp. 99-104, San Jose, Calif., November 2010; and Y. Hua, P. Liang, Y. Ma, A. Cirik and Q. Gao, "A method for broadband full-duplex MIMO radio," IEEE Signal Processing Letters, 2012) where the transmitters are prefiltered such that the waveform from a primary transmit chain and the waveform from a secondary (cancellation) chain cancels each other at the receiver's RF frontend. These methods will be referred to as hybrid-1 as shown in FIG. 1. The cancellation path is driven by a digital source waveform and also filtered digitally, but however the output of the cancellation path cancels the interference in an analog fashion at the RF frontend of the receiver. Compared to all-digital, the hybrid-1 reduces the burden of potential saturation of the receiver's frontend. But it still suffers from the transmission noise as for all-digital. Therefore, there is a need for a new hybrid radio interference cancellation.

SUMMARY

The present invention overcomes the limitations of the prior art by providing a new hybrid radio interference cancellation and a new all-analog radio interference cancellation using cables, attenuators and power splitters. In the new hybrid approach, the cancellation path taps a source waveform directly from the radio frequency (RF) end of the transmit chain, converts it into baseband for digital filtering and then yields a baseband analog cancellation waveform for cancellation. In the new all-analog approach, the cancellation path comprises of cables, attenuators and power splitters/combiners (CAPS) that process the RF waveform for cancellation entirely in the RF frontend. The CAPS uses a cluster of RF attenuators to form each conventionally known as complex tap in transversal filter. FIG. 13 is an example of the m-th (complex) tap of the CAPS cancellation channel.

In contrast to the prior art, the CAPS method does not use any adjustable phase-shifter, and it only requires the tuning of the attenuations of the attenuators. The residual interference is generally a linear function of the attenuations, although the exact linearity is not necessary with our tuning algorithm outlined previously. The attenuation of an attenuator, such as digital step attenuator, can be set very precisely. Currently, digital step attenuators with 0.5 dB step (for frequency up to 4 GHz) are widely available. No prior art for radio interference cancellation can handle real-time tuning in the presence of the unknown distortion functions $H\_1(f)$ and $H\_2(f)$ and the transmission noise $w(n)$.

In addition to passive interference suppression and all-analog (active) interference cancellation, the residual interference should be further canceled using the hybrid and/or digital methods. The CAPS method can reduce the interference at the RF frontend much better than all prior methods so that the application of the hybrid and/or digital methods becomes more feasible.

With commercially available components, the CAPS method is readily applicable for radio interference cancellation at cellular base stations and vehicle-based radios where the interference cancellation requirement is high and there is a sufficient room for the required hardware components.

All the hardware and software components required by the CAPS method can also be integrated into a single small-size unit for low power radio devices such as smart phones.

In one embodiment, attenuators and power splitters (CAPS) cancel self-interference from a transmitter to a receiver at a radio frequency (RF) frontend. The CAPS method uses the output of the RF power amplifier of the transmit chain to cancel the interference received at the RF frontend of the receiver just before the low noise amplifier (LNA). In a preferred embodiment, the CAPS method uses an all-analog cancellation channel comprising of cables, attenuators and power splitters.

In another embodiment, CAPS cancellation channels that comprise RF cables of predetermined lengths or delays, adaptive RF attenuators A1, B1, A2, B2, ..., AN and BN, and multi-way RF power splitter(s)/combiner(s). The CAPS cancellation channel comprises of RF cables of predetermined lengths or delays, adaptive RF attenuators A1, B1, A2, B2, ..., AN and BN, and multi-way RF power splitter(s)/combiner(s)

In the CAPS cancellation channel, the attenuation of each attenuator (except A0) must be adaptively controllable. Such attenuators are commercially available. The multi-way power splitter/combiner can be a combination of several power splitters/combiners.

The key is that with our CAPS design, the frequency response of the CAPS cancellation channel with the attenuations as the only tuning parameters is sufficient to match that of the interference channel. The commercially available step attenuators are of sufficient precision. (Attenuation in dB can be easily converted to or from a linear-scale attenuation.) Furthermore, the frequency response of the CAPS cancellation is generally a highly linear (and low noise) function of the attenuation parameters.

We have discovered a (novel) tuning method of the attenuation parameters $A\_1, B\_1, \ldots, A\_N, B\_N$ is based on the system configuration, the method allows for online tuning of the CAPS method. To tune the attenuation parameters of the CAPS channel, we use the knowledge of $x(n)$ and $y(n)$. When the CAPS channel is optimally tuned, $y(n)$ is minimally contaminated by the interference caused by $x(n)$ and $w(n)$.

Application of the CAPS method to MIMO radios is straightforward. Between each pair of a transmit antenna and a receive antenna, we can use a CAPS (cancellation) channel. The tuning of each CAPS channel can be done separately.

The CAPS method can be used for interference cancellation between two or more radios that are separated in locations provided that cables between these radios can be installed. That is, the CAPS method can be used for inter-cell interference cancellation between cellular base stations.

In another embodiment, the cancellation path comprising H5, G and H6 can be made relatively noise free compared to the transmission noise. The system accomplishes hybrid all-analog radio interference cancellation using cables, attenuators and power splitters and the input $x(n)$ represents the digital source interference signal before DAC (digital-analog converter) in the transmit chain. The noise $w(n)$ is the unknown transmission noise from the entire transmit chain. The output $y(n)$ represents the received digital signal after ADC (analog-digital converter) in the receive chain. This observable has two components: one is due to the desired signal $s(n)$ from a remote radio and the other is due to both $x(n)$ and $w(n)$.

In yet another embodiment, a cascade form of a hybrid all-analog radio interference cancellation using cables, attenuators and power splitters. To reduce the noise caused by LNA, it is desirable to reduce the interference at the RF frontend of the receiver. With a reduced interference at the RF front-end, the gain of LNA can be increased. The noise figure of LNA generally decreases with the gain, which is typically as small as 3 dB at the highest gain. Although the hybrid-2 alone cannot achieve that, it can be used in tandem after the all-analog. Furthermore, hybrid-2 can be used in cascade with hybrid-1 (and both hybrids can be used after the all-analog cancellation).

BRIEF DESCRIPTION OF THE DRAWINGS

These and other features, aspects and advantages of the present invention will become better understood with regard to the following description, appended claims, and accompanying figures where:

DETAILED DESCRIPTION

Figure 1:
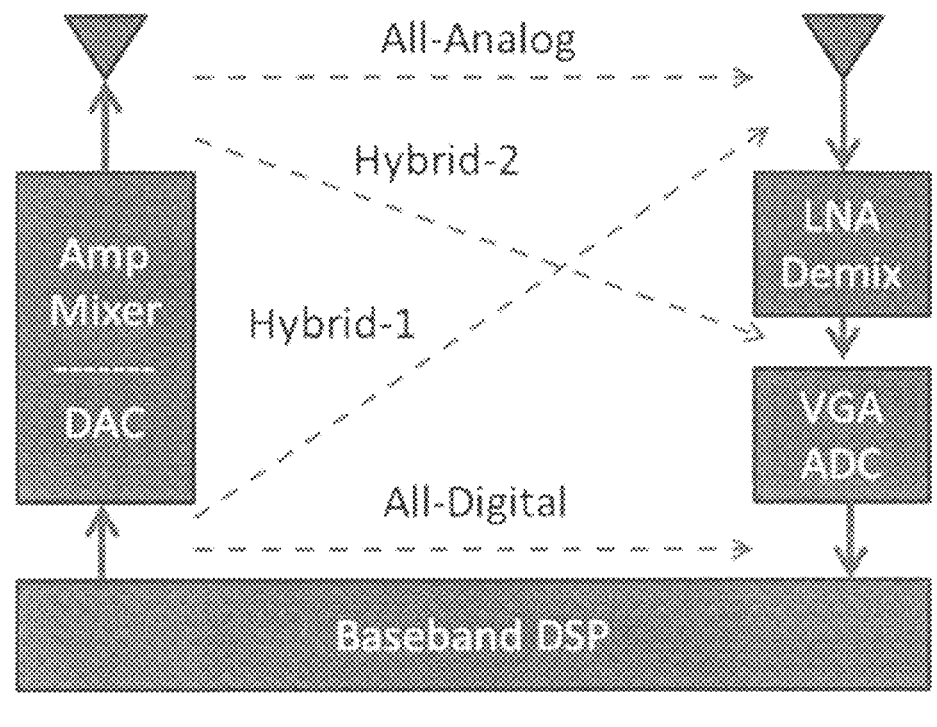
FIG. 1 is a prior art diagram showing a hybrid-1 cancellation chain.

Various embodiments provide a system, device and a method for a new hybrid all-analog radio interference cancellation using cables, attenuators and power splitters (CAPS). The system, device and method will now be disclosed in detail.

The document by the inventors: "Breaking the Barrier of Transmission Noise in Full-Duplex Radio," by Yingbo Hua, Yiming Ma, Ping Liang, and Ali Cirik Department of Electrical Engineering, University of California, Riverside, which documents some of the mathematical concepts used herein, is hereby incorporated by reference in its entirety.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

Various embodiments provide a system, device and a method for a new hybrid all-analog radio interference cancellation using cables, attenuators and power splitters (CAPS). The system, device and method will now be disclosed in detail.

Figure 2:
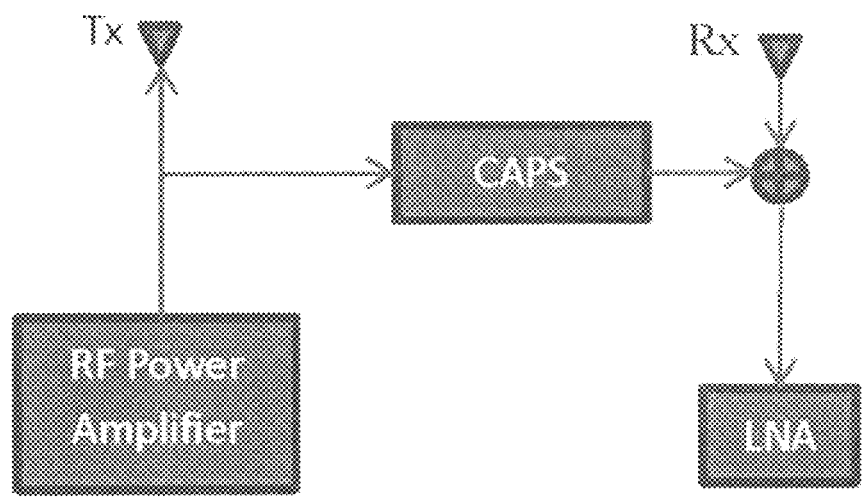
FIG. 2 is a diagram of a radio interference cancellation device using cables, attenuators and power splitters (CAPS), that cancels self-interference from a transmitter to a receiver at a radio frequency (RF) frontend.

Referring now to FIG. 2, there is shown a diagram of a radio interference cancellation device using cables, attenuators and power splitters (CAPS) that cancels self-interference from a transmitter to a receiver at a radio frequency (RF) frontend. As can be seen, a configuration of radio interference cancellation using cables, attenuators and power splitters, that cancels the self-interference from the transmitter to the receiver at the RF frontend. The CAPS method uses the output of the RF power amplifier of the transmit chain to cancel the interference received at the RF frontend of the receiver just before the low noise amplifier (LNA). In a preferred embodiment, the CAPS method uses an all-analog cancellation channel comprising of cables, attenuators and power splitters.

Note that a power splitter is also a power combiner. The difference between the two is how the same device is connected.

Figure 3:
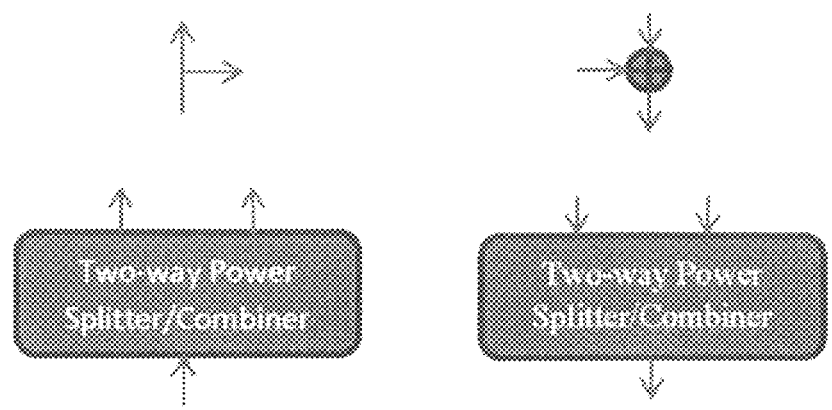
FIG. 3 is a detailed diagram of device of FIG. 2 demonstrating use of the device as a power splitter or a power combiner.

Referring now to FIG. 3, there is shown a detailed diagram of device of FIG. 2 demonstrating use of the device as a power splitter or a power combiner. The same device can be used as either a power splitter (left) or a power combiner (right). The top two graphs are the corresponding symbols of splitter and combiner.

Figure 4:
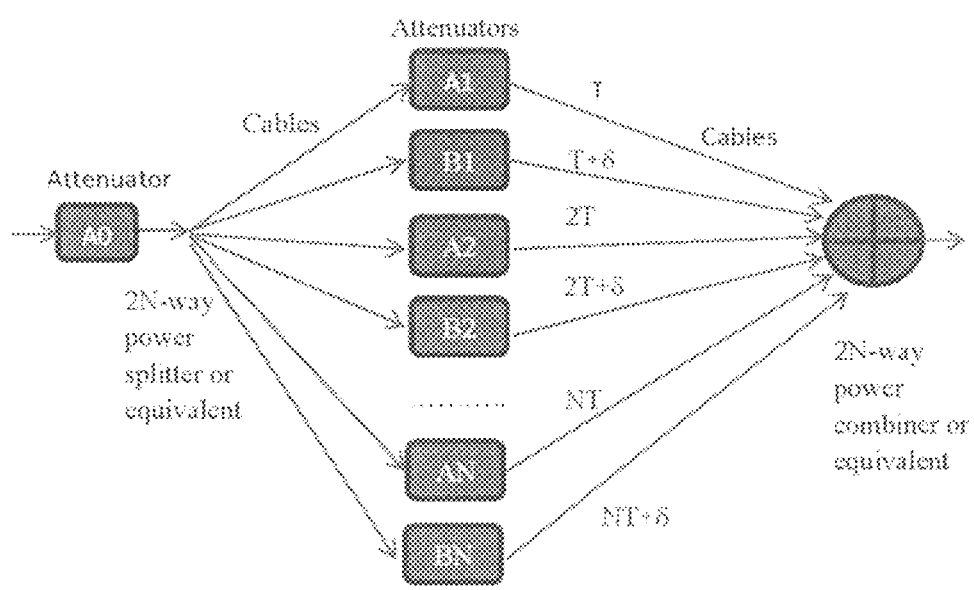
FIG. 4 is a diagram showing CAPS cancellation channels that comprise RF cables of predetermined lengths or delays, adaptive RF attenuators A1, B1, A2, B2, . . . , AN and BN, and multi-way RF power splitter(s)/combiner(s)

Referring now to FIG. 4, there is shown a diagram showing CAPS cancelation channels that comprise RF cables of predetermined lengths or delays, adaptive RF attenuators $A_1, B_1, A_2, B_2, \ldots, A_N$ and $B_N$, and multi-way RF power splitter(s)/combiner(s). The CAPS cancelation channel comprises of RF cables of predetermined lengths or delays, adaptive RF attenuators $A_1, B_1, A_2, B_2, \ldots, A_N$ and $B_N$, and multi-way RF power splitter(s)/combiner(s).

Shown in FIG. 4 are the main components in the CAPS cancelation channel. The attenuation of each attenuator (except A0) must be adaptively controllable. Such attenuators are commercially available. The multi-way power splitter/combiner can be a combination of several power splitters/combiners. For the shortest delay (if desired), the smallest number of multi-way splitters/combiners should be used, or equivalently the splitters/combiners each with the largest number of ports should be used. There is a relative delay difference T between the $A_1$ path and the $A_2$ path (and other similar pair of adjacent paths). The delay T should be smaller than the inverse of the bandwidth of interest. There is another relative delay difference between the A1 path and the B1 path (and other similar pair of adjacent paths). The delay δ should be equal (or approximately equal) to $$\frac{1}{4f_c}$$

where $f_c$ is the carrier frequency. All the delay requirements can be met by choosing the lengths of the cables accordingly. The number N should be such that NT is larger than the delay spread of the interference channel. We can choose NT as an upper bound on the difference between the shortest and the longest possible radio reflection paths (of interest) between the transmit antenna and the receive antenna.

Figure 5:
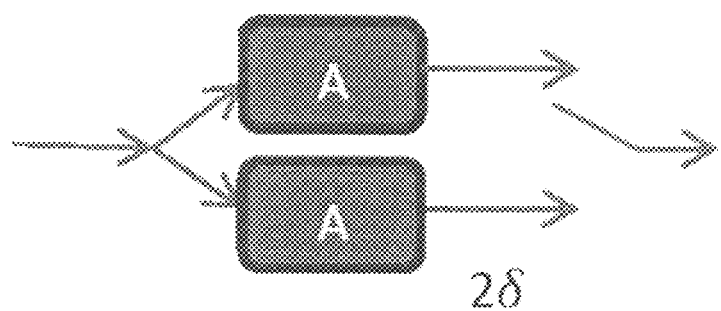
FIG. 5 is a diagram of a pair of attenuators with a relative delay difference that using a half-wavelength difference of the total lengths of the cables.

The attenuation of each attenuator shown in FIG. 3 is allowed to have either zero-degree phase or 180-degree phase. For zero-degree phase, no further change is required. To implement a 180-degree phase change, an additional segment of cable of relative delay equal to $$2\delta = \frac{1}{2f_c}$$

should be used as shown in FIG. 5.

Referring now to FIG. 5, there is shown a diagram of a pair of attenuators with a relative delay difference that using a half-wavelength difference of the total lengths of the cables. As can be seen, a switch is used to select one of the two attenuators. In another embodiment, the switch can be replaced by a power combiner. In the latter case, the upper path is selected if the lower attenuator is set to the maximum attenuation (minimum gain), and vice versa.

Now we can let the effective gains of the attenuators be denoted by the real numbers. Then the frequency response of the CAPS cancelation channel in the frequency region of interest is:

$$G(f) = A_0 e^{-j2\pi fT_0} \sum_{n=1}^{N} (A_n + B_n e^{-j2\pi f\delta}) e^{-j2\pi fTn}, \quad \text{(Eq. 1)}$$

where $$|f - f_c| < \frac{W}{2}, T < \frac{1}{W}, f_c\delta = \frac{1}{4}, NT > T_d,$$

W is the bandwidth of interest, and $T_d$ is the delay spread of the interference channel. ($T_0$ represents a common portion of the delays of all attenuation paths.) Typical numerical examples include: $f_c$=2.4 GHz, W=20 MHz, and $T_d$=100 ns. The delay spread lends to become much larger if either the line-of-sight propagation between the Tx antenna and the Rx antenna is blocked (as desired for local interference suppression) or the distance between the Tx antenna and the Rx antenna is large (as in the case for inter-cell interference cancelation between base stations). Only if $$Td < \frac{1}{W},$$

which corresponds to a narrowband or equivalently all-pass interference channel, then N=1 is sufficient.

Each pair of attenuator A and attenuator B with the delay can be replaced by a 90-degree power splitter followed by attenuators A and B as shown below in FIG. 4a.

Referring now to FIG. 5, there is shown a diagram comparing how a configuration having a zero-degree power splitter followed by attenuator A and attenuator B with extra delay can be replaced by a 90-degree power splitter following by attenuators A and B without any delay difference. As can be the left configuration (a zero-degree power splitter followed by attenuator A and attenuator B with extra delay) can be replaced by the right configuration (a 90-degree power splitter following by attenuators A and B without delay difference).

In this case, the frequency response of the entire CAPS cancelation channel is $$G(f) = A_0 e^{-j2\pi fT_0} \sum_{n=1}^{N} (A_n + B_n e^{-j2\pi f\delta}) e^{-j2\pi fTn}, \quad (2)$$

Here, j is $\sqrt{-1}$ j is as used before.

With either (1) or (2) within $$|f - f_c| < \frac{W}{2}$$

by choosing the parameters $A_1, B_1, \ldots A_N, B_N$ properly, the frequency response G(f) of the CAPS cancelation channel can well match the negative of the frequency response H(f) of the interference channel and hence the input to the LNA (see FIG. 1) of the receive chain is minimally affected by the interference from the transmit chain.

More importantly, we do not need a high precision of δ or 90-degree phase for the power splitter. The key is that with our CAPS design, the frequency response of the CAPS cancelation channel with the attenuations as the only tuning parameters is sufficient to match that of the interference channel. The commercially available step attenuators are of sufficient precision. (Attenuation in dB can be easily converted to or from a linear-scale attenuation.) Furthermore, the frequency response of the CAPS cancelation is generally a highly linear (and low noise) function of the attenuation parameters.

Figure 6:
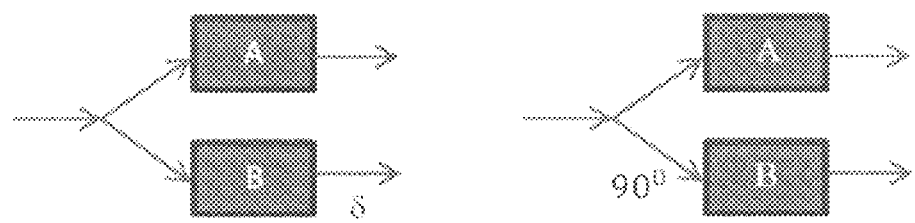
FIG. 6 is a diagram comparing how a configuration having a zero-degree power splitter followed by attenuator A and attenuator B with extra delay can be replaced by a 90-degree power splitter following by attenuators A and B without any delay difference.
Figure 7:
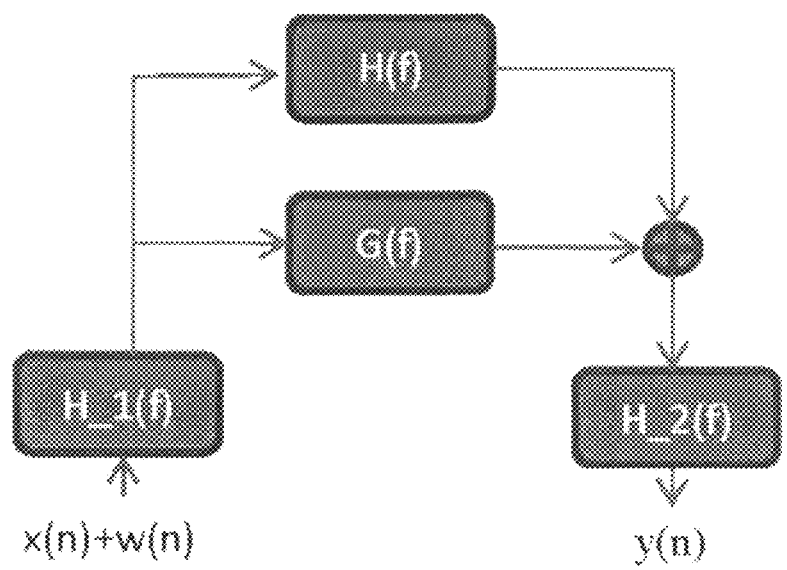
FIG. 7 is a diagram of a system configuration for online tuning where G(f) represents the CAPS cancellation channel.

Our (novel) tuning method of the attenuation parameters $A_1, B_1, \ldots A_N, B_N$ is based on the system configuration shown in FIG. 6.

Referring now to FIG. 6, there is shown a diagram of a system configuration for online tuning where G(f) represents the CAPS cancelation channel. As can be seen A system configuration for online tuning of the CAPS method where G(f) represents the CAPS cancelation channel.

In FIG. 5 there is shown the unknown interference channel between Tx antenna and Rx antenna. This represents the not precisely known channel of the transmit chain and the not precisely known channel of the receive chain, x(n) is the known, and controllable, digital input signal to the transmit chain, w(n) is an equivalent input noise used to model the transmit chain noise, including the noise and distortions from a digital to analog converter (DAC), an RF mixer and power amplifier, and y(n) is the known digital output signal from the receive chain. The unknown nature of and is mainly due to the analog interface at the RF frontend.

Note that the RF signals to and from the interference channel H(f) are not directly measurable in most practical settings of radio systems. It is the digital baseband signals x(n) and y(n) that are readily accessible.

An Online Tuning Algorithm

To tune the attenuation parameters of the CAPS channel, we use the knowledge of x(n) and y(n). When the CAPS channel is optimally tuned, y(n) is minimally contaminated by the interference caused by x(n) and w(n). An outline of the algorithm for tuning the CAPS channel is shown next. Within a (multi-dimensional) region of any given choice of the attenuation parameters $(A_1, B_1, \ldots A_N, B_N)$, the output y(n) is a linear function of these parameters. Corresponding to each input waveform x(n), we can write:

$$y = Pa + v, \quad \text{(Eq. 3)}$$

where y is the vector constructed from the output waveform y(n), P is a random matrix that depends on $H_1(f)$, $H_2(f)$, x(n) and w(n), a is the vector of the chosen parameters $A_1, B_1, \ldots A_N, B_N$, and v is a random vector that depends on H(f), $H_1(f), H_2O$, x(n) and w(n). And v may also depend on additional noise from the receive chain as well as signals from remote nodes.

Then, by repeating the above measurements and computing the average of the squared-norms of y, we have $$e = E\{y^T y\} = a^T A a + b^T a + c,$$

where E denotes average, $A = E\{P^T P\}$, $b = E\{P^T v\}$, and $c = E\{v^T v\}$. This new set of parameters (A, b and c) become constant after using a large number of measurements of y. Note that each measurement of y may only take about 10 to 100 micro-seconds, which depends on applications.

Then, one can measure a sequence of the value e (i.e., $e_1$, $e_2$, ... $e_M$) corresponding to a sequence of the training vectors of a (i.e., $a_1$, $a_2$, ... $a_M$). To accommodate some degree of nonlinearity in the system, the training vectors of a should deviate slightly from its initial reference. From this pair of sequences, one can uniquely determine A, b and c. After that, one can determine a refined choice of a, which minimizes e based on the estimates of A, b and c.

With a new a, one can repeat the above process until convergence. Naturally, if y(n) is linear in terms of $A_1$, $B_1, \ldots A_N, B_N$, then the above process converges after only one iteration. A slight nonlinearity (which can be expected in same cases) will result in a few more iterations.

Other tuning methods can also be applied. One such option is to tune the pairs $(A_1, B_1), (A_2, B_2), \ldots (A_N, B_N)$, sequentially until convergence.

Application to MEMO Radio

Application of the CAPS method to MIMO radios is straightforward. Between each pair of a transmit antenna and a receive antenna, we can use a CAPS (cancelation) channel. The tuning of each CAPS channel can be done separately.

Application to Inter-Radio Interference Cancelation

The CAPS method can be used for interference cancelation between two or more radios that are separated in locations provided that cables between these radios can be installed. That is, the CAPS method can be used for inter-cell interference cancellation between cellular base stations.

Figure 8:
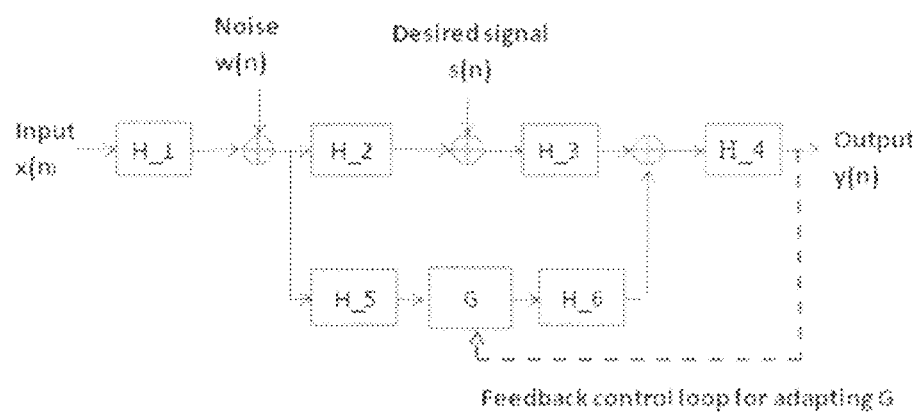
FIG. 8 is a schematic diagram of a system for a hybrid all-analog radio interference cancellation using cables, attenuators and power splitters according to one embodiment of the invention.

Referring now to FIG. 8, there is shown a schematic diagram of a system for a hybrid all-analog radio interference cancellation using cables, attenuators and power splitters according to one embodiment of the invention. In this embodiment, the input x(n) represents the digital source interference signal before DAC (digital-analog converter) in the transmit chain. The noise w(n) is the unknown transmission noise from the entire transmit chain. The output y(n) represents the received digital signal after ADC (analog-digital converter) in the receive chain. This observable has two components: one is due to the desired signal s(n) from a remote radio and the other is due to both x(n) and w(n).

The cancellation path is represented by H5, G and H6 where G is an adaptive filter. If the transfer function G is such that H6 GH5=−H3 H2, then neither x(n) nor w(n) affects y(n). It is important to note that none of the H transfer functions (H1 to H6) is known precisely enough and they should be treated as unknown. This is because the exact knowledge of the transfer function of an analog-interfaced component is difficult to obtain. Given unknown H1, . . . , H6 and unknown w(n), finding G is a blind system identification and equalization problem (which however differs from the conventional blind equalization problems in the literature). More detailed descriptions of the H functions are as follow:

H1 represents the equivalent baseband channel transfer function (or simply channel) between a digitally generated baseband waveform x(n) and the output of the RF power amplifier in the transmit chain. The noise w(n) represents a combination of all noises generated in the transmit chain, which include the quantization noise in generating the transmitted baseband waveform at DAC, the noise from the up-conversion RF mixer, and the noise from the transmit power amplifier.

H2 represents the channel between the transmit antenna and the receive antenna when two separate antennas are used for transmitting and receiving. H2 may also represent the isolation path of an RF circulator when a single antenna is used along with the RF circulator for both transmitting and receiving.

H3 represents the channel between the receive antenna and an analog baseband signal combiner just before VGA. (For all-analog, the signal combiner should be RF and before LNA.)

H4 is the channel between the analog signal combiner and the output y(n), which includes VGA and ADC. (For all-analog, H4 is the entire receive chain after the RF combiner.)

H5 is the channel between the output of the transmit power amplifier in the transmit chain and the input of the digital filter G, which may include a baseband-frequency sampler, a low pass filter and an ADC. This block does not need any carrier-frequency oscillator which tends to have a large phase noise.

H6 is the channel between the output of the digital filter G and the signal combiner, which includes a DAC for analog signal combining before VGA. (For all-analog, G is an analog filter, H5 models the input interface of G, and H6 models the output interface of G.)

The cancellation path comprising H5, G and H6 can be made relatively noise free compared to the transmission noise. Note that the power of the quantization noise from a 14-bits ADC, for example, is over 70 dB weaker than the signal power, which is insignificant compared to a typical trans-mission noise. For most applications, all H functions may appear all-pass with some delays while H2 tends to be highly frequency-selective depending on the environment surrounding the transmit antenna and the receive antenna. However, for high-quality interference cancellation (such as 50 dB or more), all H functions need to be treated as unknown when the parameters of G are optimized in minimizing the interference in y(n). To find the optimal G online, the output signal y(n) is the only observable we have to rely on, which we will discuss the detail shortly.

Figure 9:
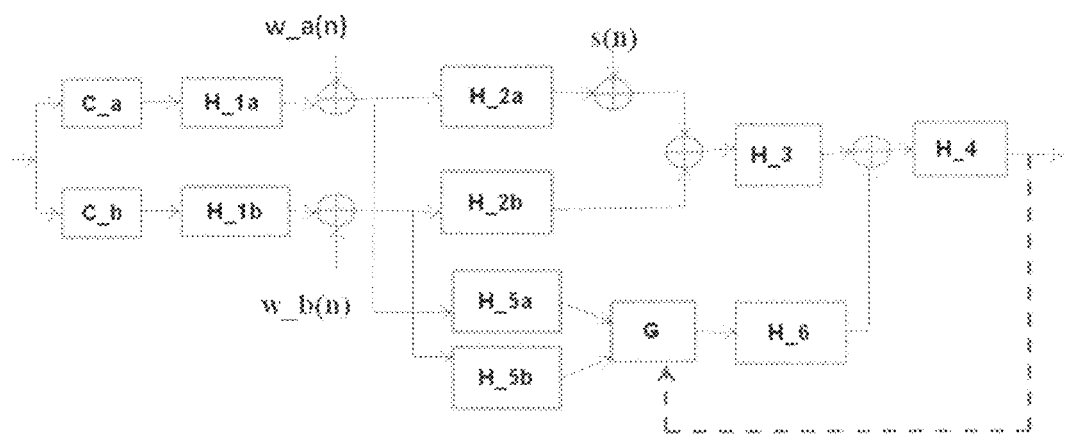
FIG. 9 is a schematic diagram of a cascade form of a hybrid all-analog radio interference cancellation using cables, attenuators and power splitters according to another embodiment of the invention.
Figure 10:
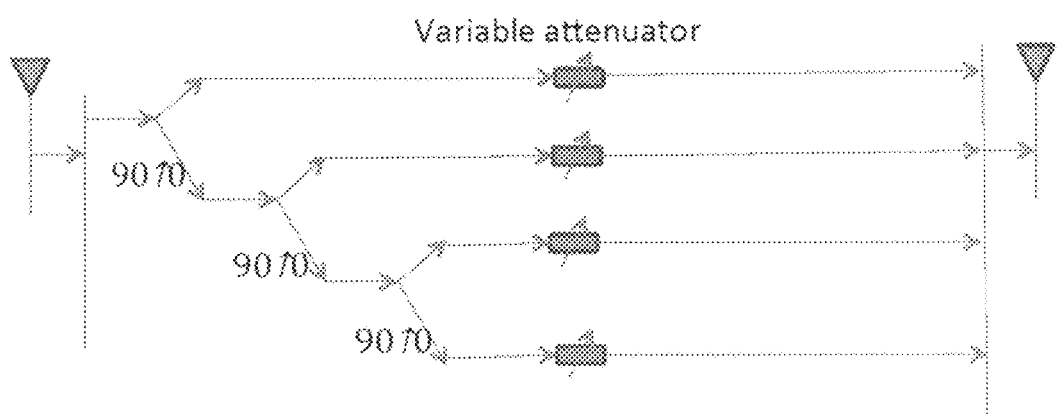
FIG. 10 is a diagram of a one-tap CAPS cancellation channel with three two-way 90-degree power splitters and variable attenuators.
Figure 11:
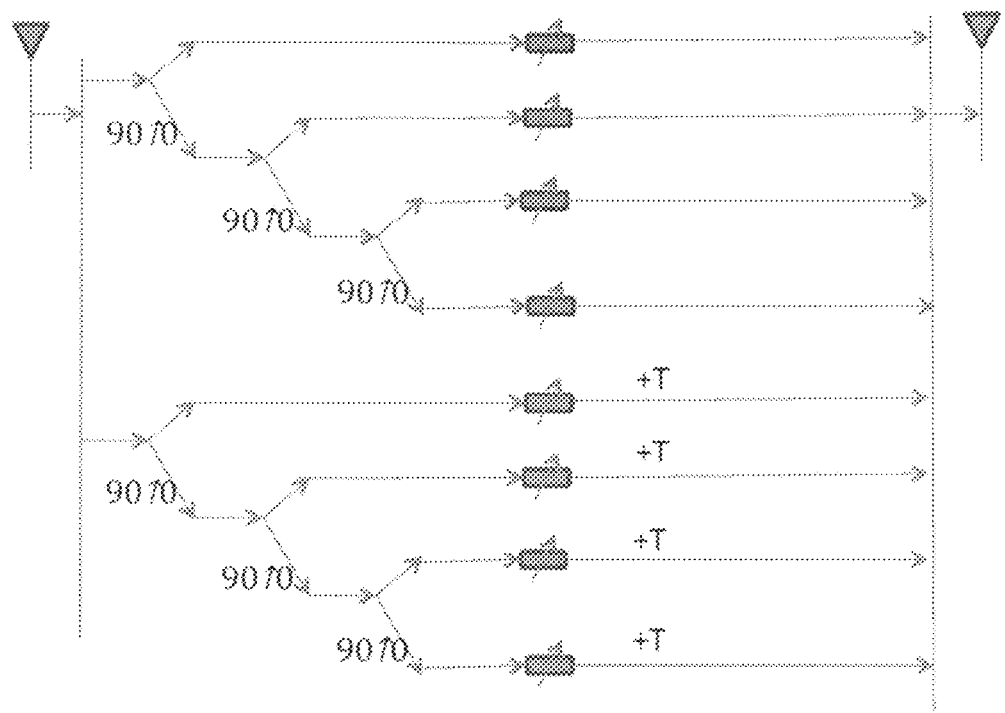
FIG. 11 is a diagram of a two-tap CAPS cancellation channel with extra delays T in the $2^{nd}$ tap.
Figure 12:
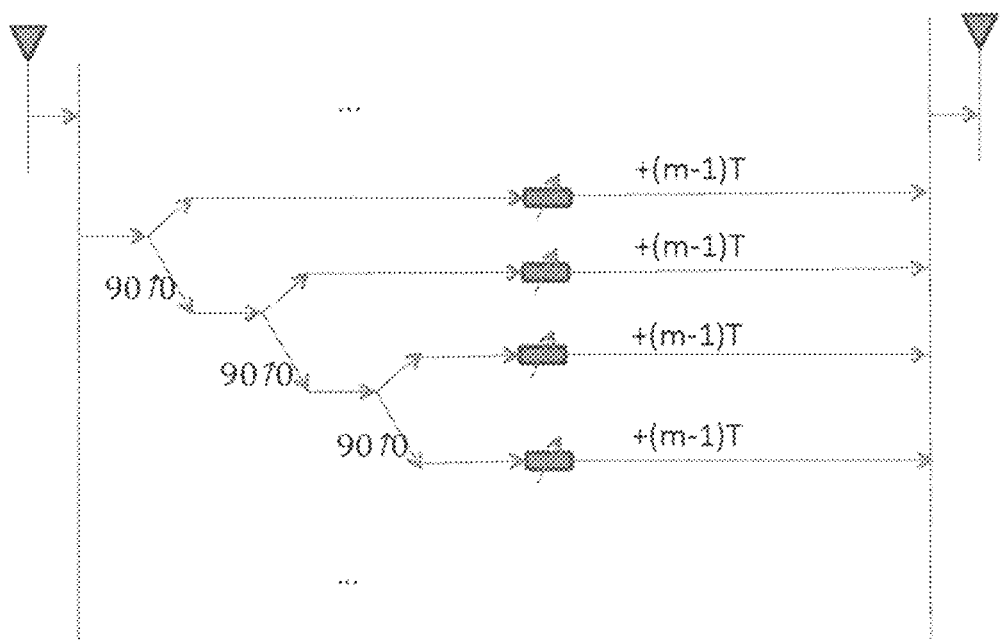
FIG. 12 is a diagram of an m-th tap in a multi-tap CAPS cancellation channel.
Figure 13:
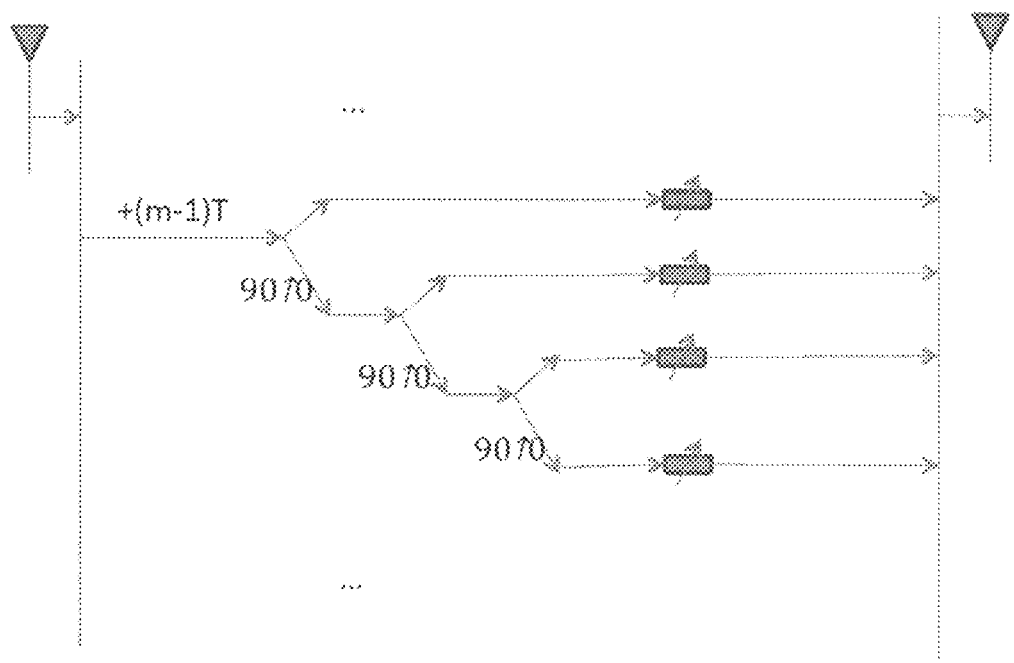
FIG. 13 is a diagram of an alternative placement of an extra delay (m−1)T in the m-th tap in a multi-tap CAPS cancellation channel.

Referring now to FIG. 9, there is shown a schematic diagram of a cascade form of a hybrid all-analog radio interference cancellation using cables, attenuators and power splitters according to another embodiment of the invention. To reduce the noise caused by LNA, it is desirable to reduce the interference at the RF frontend of the receiver. With a reduced interference at the RF front-end, the gain of LNA can be increased. The noise figure of LNA generally decreases with the gain, which is typically as small as 3 dB at the highest gain. Although the hybrid-2 alone cannot achieve that, it can be used in tandem after the all-analog. Furthermore, hybrid-2 can be used in cascade with hybrid-1 (and both hybrids can be used after the all-analog cancellation).

Shown in FIG. 9 is a cascade form of the hybrid-2 with a special form of the time-domain transmit beamforming method (hybrid-1). Here, $C_a$ and $C_b$ are the waveform prefilters which should be chosen to reduce the self-interference at the RF frontend (at the sum immediately after the desired signal s(n). $C_a$ is the prefilter for the primary transmit chain, and $C_b$ for the secondary (cancellation) transmit chain. The hardware associated with Hia and Hib is similar to that of Hi in FIG. 4 where i=1, . . . , 6. If there were no transmission noises wa(n) and wb(n), $C_a$ and $C_b$ could be chosen to yield a zero net contribution at the sum after s(n). But with wa(n) and wb(n) (due to RF oscillator, RF mixers and power amplifiers embedded in H1 a and H1 b), there can be a significant amount of residue interference even if $C_a$ and $C_b$ are perfectly chosen. Due to noisy channel estimates, the choice of $C_a$ and $C_b$ can not be perfect, which introduces additional residue interference. To reduce the residue interference left from $C_a$ and $C_b$, the adaptive filter G with two inputs can be used as shown.

In order to find the optimal transfer function G of the adaptive filter during training, we must have a system model in terms of G. This model must take into account the unknown nature of the H functions. In the following, we will only consider the basic configuration shown in FIG. 4. (Although useful for finding the parameters of the all-analog cancellation path [3], the following discussions assume that G is digital.)

During training, we assume the absence of s(n), and hence the output y(n) is simply the self-interference. We model y(n) as a linear (but otherwise unknown) function of x(n) and w(n), and also as an affine (but otherwise unknown) function of the impulse response of G(z). The unknown nature here is due to the unknown H functions. The optimal solution for G(z) follows directly from the system model as described in "Breaking the Barrier of Transmission Noise in Full-Duplex Radio," by Yingbo Hua, Yiming Ma, Ping Liang, and Ali Cirik Department of Electrical Engineering, University of California, Riverside, which is hereby incorporated by reference in its entirety.

Referring now to FIGS. 10, 11, 12 and 13 there is shown a diagram of a one-tap CAPS cancellation channel with three two-way 90-degree power splitters and variable attenuators; a two-tap CAPS cancellation channel with extra delays T in the $2^{nd}$ tap; an m-th tap in a multi-tap CAPS cancellation channel; and a diagram An alternative placement of the extra delay (m−1)T in the m-th tap in a multi-tap CAPS cancellation channel. Multi-layered CAPS can be useful where the tuning of multiple CAPS layers can be done sequentially as the residual interference reduces with each new layer. Also, the tuning of all attenuators can be done with our on-line tuning method subject to the positiveness constraint on the attenuations.

What has been described is a hybrid all-analog radio interference cancellation system that cancels self-interference from a transmitter to a receiver at a radio frequency frontend, overcoming the limitations and disadvantages inherent in the related art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A radio interference cancelation device that cancels self-interference from a transmitter to a receiver, the system comprising:
   a 2N-way RF power splitter having an input and 2N outputs, wherein N is an integer;
   a power combiner having 2N+1 inputs and an output; and
   2N adaptively controllable attenuators, each adaptively controllable attenuator coupled by cables between a different output of the 2N-way RF power splitter and a different input of the power combiner, each cable having a total length selected to provide a delay equal to a different one of mT(m=1,N) and mT+δ (m=1,N), where T is a delay smaller than the inverse of a bandwidth of the transmitter and receiver, and δ is ¼$f_c$, where $f_c$ is the carrier frequency of an RF signal transmitted by the transmitter.

2. The device of claim 1 wherein N is chosen such that NT is larger than the delay spread of an interference channel of the transmitter and receiver.

3. The device of claim 1, wherein the adaptively controllable attenuators each have a static phase-shift.

4. The device of claim 3, where the adaptively controllable attenuators has a phase shift of one of 0° or 180°.

5. The device of claim 1, further comprising an additional length of cable having a relative delay equal to 2δ=1/(2$f_c$) in selected cables to produce a 180-degree phase shift.

6. The device of claim 1, wherein the adaptively controllable attenuators are controlled with a tuning algorithm.

7. The device of claim 6, wherein the tuning algorithm comprises analog circuits configured to calculate y=Pa+v, where y is a vector constructed from an output waveform y(n), P is a random matrix, a is a vector of chosen parameters A_1, B_1, . . . , A_N, B_N, and v is a random vector.

8. The device of claim 7, wherein y is sampled every 10 to 100 micro-seconds.

9. The device of claim 7, where v comprises additional noise from a receiver coupled to the device and from radio frequency received from remote nodes.

10. The device of claim 1, wherein the adaptively controllable attenuators are digital step attenuators.

11. The device of claim 9, wherein digital steps of the digital step attenuators are at least 0.5 dB steps.

12. The device of claim 1, further comprising:
   a radio frequency transmitter coupled to a transmit antenna through an output of an RF power amplifier,
   an input attenuator having an input coupled to the output of the RF power amplifier and an output coupled to the input to the 2N-way RF power splitter; and
   a receive antenna coupled to an input of the power combiner.

13. A method for canceling self-interference from a transmitter to a receiver at a radio frequency frontend, the method comprising:
   splitting an output RF signal from the transmitter into 2N analog signal paths;
   providing in each signal path an adaptively controllable attenuator and a delay element, each delay element providing a delay equal to a different one of mT (m=1,N) and mT+δ (m=1,N), where T is a delay smaller than the inverse of a bandwidth of the transmitter and receiver, and δ is ¼$f_c$, where $f_c$ is the carrier frequency of an RF signal transmitted by the transmitter, and
   combining outputs of all of the adaptively controllable attenuators delay elements with an RF signal received from the transmitter on a receive antenna.

14. The method of claim 13 wherein N is chosen such that NT is larger than the delay spread of an interference channel of the transmitter and receiver.

15. The method of claim 13, wherein the adaptively controllable attenuators each have a static phase-shift.

16. The method of claim 15, where the adaptively controllable attenuators has a phase shift of one of 0° or 180°.

17. The method of claim 13, further comprising controlling the adaptively controllable attenuators with a tuning algorithm.

18. The method of claim 17, wherein the tuning algorithm comprises calculating y=Pa+v, where y is a vector constructed from an output waveform y(n), P is a random matrix, a is a vector of chosen parameters A_1, B_1, . . . , A_N, B_N, and v is a random vector.

19. The method of claim 13, further comprising tuning the adaptively controllable attenuators in digital steps.

20. A radio interference cancelation system that cancels self-interference from a transmitter to a receiver, the system comprising:
   a radio frequency transmitter coupled to a transmit antenna through an output of an RF power amplifier,
   an input attenuator coupled to the output of the RF power amplifier;
   a 2N-way RF power splitter;
   a receive antenna;
   a power combiner having 2N+1 inputs, one input of the power combiner coupled to the receive antenna;
   a low noise amplifier for a radio frequency receiver coupled to an output of the power combiner;
   2N adaptively controllable attenuators, each adaptively controllable attenuator coupled by cables between a different output of the 2N-way RF power splitter and a different input of the power combiner, each cable having a total length selected to provide a delay equal to a different one of mT(m=1,N) and mT+δ (m=1,N), where T is a delay smaller than the inverse of a bandwidth of the transmitter and receiver, and δ is ¼$f_c$, where $f_c$ is the carrier frequency of an RF signal transmitted by the transmitter.

* * * * *